June 5, 1934.　　　　G. M. PESTARINI　　　1,962,030
ROTARY TRANSFORMER FOR DIRECT ELECTRIC CURRENTS
Filed June 24, 1933
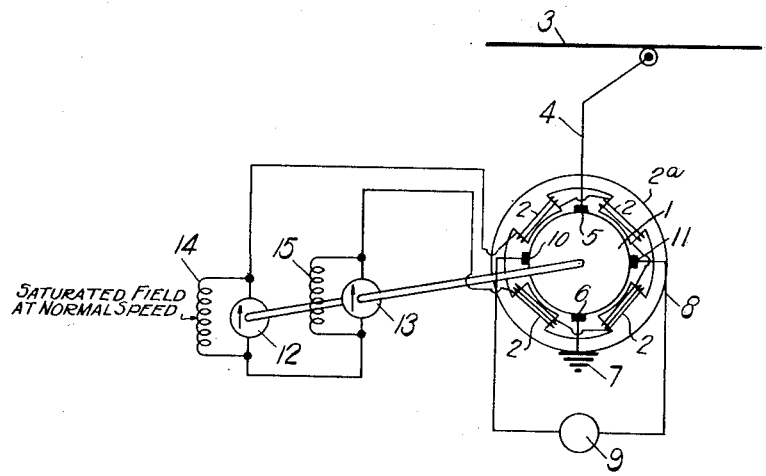
INVENTOR
Giuseppe M. Pestarini
By ＿＿＿＿＿＿
ATTORNEY Patented June 5, 1934

1,962,030

UNITED STATES PATENT OFFICE 1,962,030

ROTARY TRANSFORMER FOR DIRECT ELECTRIC CURRENTS

Giuseppe Massimo Pestarini, Sheffield, England

Application June 24, 1933, Serial No. 677,520
In Great Britain July 25, 1932

3 Claims. (Cl. 171—123)

This invention relates to rotary transformers for direct electric currents and has special reference to apparatus of this kind, now commonly called a metadyne transformer.

The metadyne transformer is a rotary apparatus which is designed to transform a current supplied to it at a fixed voltage and variable amperes into a current of substantially constant amperes and variable voltage. The apparatus comprises in its simplest form a rotor provided with windings and a commutator somewhat similar to the armature of a direct current dynamo electric machine. Ordinarily two pairs of brushes are arranged to make contact with the commutator, the primary current passing into and out of the rotor by one pair and the secondary current being available at the other pair. The rotor is rotated at constant speed. The primary current flowing in the rotor windings sets up a primary flux which is fixed in direction and may be said to be cut by rotor conductors in which a voltage is thereby induced and a constant secondary current can be drawn from the secondary circuit or circuits at variable voltage. A stator is provided which affords a return path of low magnetic reluctance for the fluxes which are set up by the rotor currents.

For a fuller description of metadyne transformers reference is directed to the specification of French Patents No. 647,855, dated 25th February 1922, No. 623,438 dated 27th January 1926, and No. 637,946, dated 25th November 1926 and various patents of addition to these patents. A description of the general construction and operation of metadyne transformers, generators and motors treated mathematically in considerable detail will also be found in a paper entitled "Esquisse sur la Metadyne" by G. M. Pestarini in the Bulletin Scientifique A. I. M. No. 4 April 1931 of L'Association des Ingénieurs Electriciens, published by the Institut Electrotechnique Montefiore, Liége.

The stator of a metadyne transformer is furnished with windings by which various magnetic fluxes can be obtained which combine with or modify the magnetic fluxes due to the primary and secondary currents circulating in the rotor and thereby regulate the electro-mechanical performance of the machine. One of these stator windings termed the regulator winding is provided for the purpose of varying the rotor torque in order to maintain the metadyne transformer running as nearly as possible at a desired normal speed. The current supply to the regulator winding has hitherto been usually obtained from the main supply through a shunt excited dynamo electric machine mounted on the metadyne transformer shaft. Where, however, the main supply current is at a high voltage such, for example as 3000 volts in the case of an electric locomotive provided with a metadyne transformer equipment for controlling the supply of current to the traction motors, it is desirable to avoid the use for the purpose of exciting the regulator winding of a machine connected to the mains, which machine must, of course, be insulated for the high voltage.

According to the present invention in order to overcome this difficulty two machines are provided mounted on or direct coupled to the shaft of the metadyne transformer. Each machine is provided with shunt field windings and one of them, hereinafter called the dynamo, is arranged to be normally operated with a saturated magnetic field, whereas the other, hereinafter called the regulator, has its field arranged to be unsaturated. The regulator winding of the metadyne transformer is connected to the terminals of the two machines in such a manner as to be excited by the current due to the difference in voltage of the two machines.

Under these conditions when the metadyne transformer is running at normal speed no current traverses the regulator winding, a variation in speed will cause a small variation in the voltage of the dynamo, but a relatively large variation of the voltage of the regulator. Consequently a relatively large variation in current circulating between the dynamo and the regulator is obtained, which causes a relatively large variation in the excitation of the regulator winding of the metadyne transformer. This current in the regulator winding serves to change the speed of the metadyne transformer towards its normal value in the desired direction.

The accompanying drawing is an electrical diagram showing the circuit arrangements of a metadyne transformer and machines for supplying current to the regulator winding arranged according to the present invention.

In the drawing, 1 indicates the rotor of the metadyne transformer, the stator 2ª of which has the regulator winding thereon as indicated at 2. The rotor is supplied with primary current from a supply line 3 through a conductor 4 and primary brushes 5 and 6, the return circuit being completed to ground 7. The secondary circuit of the metadyne transformer is indicated at 8, including a consumption device indicated by an armature 9 of an electric motor for example, and is cross-connected to the secondary brushes 10, 11 of the metadyne transformer. It will be understood that the secondary circuit of the transformer may be connected in other ways, for example according to the well known figure 8 connection. The machines for supplying current to the regulator winding 2 are indicated at 12 and 13, 12, for example, being the dynamo and 13 the regulator machines. Their rotors may be mounted on the same shaft as the rotor 1 of the metadyne transformer so that all three machines rotate at the same speed. As shown, said machines are provided with shunt exciting windings 14 and 15 respectively, and are connected to the regulator winding in such manner that their voltages are in opposition. The machines 12 and 13 are substantially similar, except that the saturation voltage of the regulator 13 is higher than the saturation voltage of the dynamo 12 and their speed characteristics are such that when rotating at the desired normal speed of the metadyne transformer their voltages will be equal, but the field magnet of the dynamo 12 will be saturated, whereas the field magnet of the regulator 13 will be unsaturated. When the speed of the machines is below the desired speed the dynamo will have a higher voltage than the regulator, and the direction of current in the regulator winding 2 is arranged to be such that the magnetic flux due to it will give rise to an accelerating torque on the rotor 1 and thus raise the speed of the combined machines to the desired normal speed. When this is attained, the voltages of the dynamo and regulator being equal, the current in the regulator winding will be zero and no flux will be produced thereby, so that said winding will have no effect on the speed of the rotor 1. If the speed of the machines is above the desired normal speed the voltage of the regulator will be higher than that of the dynamo and a current will flow through the regulator winding in the reverse direction so that a retarding torque will be exerted on the rotor 1 and the speed of the machines will be reduced to the desired normal speed.

The machines 12 and 13 may either or both of them be furnished with some series compounding windings on their respective field magnets, in which case the rapidity of action or of change in voltage of the machines, with an alteration in speed, will be increased. The arrangement of simple shunt wound machines as is described is, however, to be preferred.

It will be observed that in the arrangement according to the invention neither the dynamo nor the regulator is connected to the main voltage line, except in such cases as they may be used for starting, in which case a comparatively large resistance may be included, and these machines may consequently be wound for a comparatively small voltage, for example in the neighbourhood of 100 volts, and employed with a metadyne transformer supplied with energy from a source having a much higher voltage of 1500 or 3000 volts for example. The arrangement is very suitable for use with a direct electric current traction system with a high voltage supply but is not limited to this particular use.

I claim:

1. The combination with a metadyne transformer having a regulator winding on its stator, of two shunt excited dynamo electric machines, means for rotating said machines at speeds having a substantially constant ratio with each other and with the speed of the metadyne transformer, and electrical connections between the regulator winding and the said two dynamo electric machines whereby said machines supply current to said winding in opposition.

2. The combination with a metadyne transformer having a regulator winding on its stator, of two shunt excited dynamo electric machines, means for rotating said machines at speeds having a substantially constant ratio with each other and with the speed of the metadyne transformer, said machines being connected to the regulator winding in such a manner that their voltages oppose one another, and their respective exciting windings being arranged so that when the metadyne transformer is rotating at a desired normal speed the voltages of the two machines shall be equal, whereby in such case no current will be supplied to the regulator winding, but one machine shall be operating with a magnetically saturated field, whereas the field of the other machine is magnetically unsaturated.

3. A metadyne transformer provided with a regulator winding supplied with direct current from two shunt excited dynamo electric machines connected so that their voltages oppose one another, and mounted on or direct coupled to the shaft of the transformer, one of said machines having a normally saturated magnetic field and the other having a normally unsaturated magnetic field, the voltages of the two machines being equal when the transformer is rotating at the desired speed and the connection of the regulator winding to its exciting circuit being such that when the speed of the transformer is below the desired speed the regulator winding will give rise to an accelerating torque and when the speed of the transformer is above the desired speed the regulator winding will give rise to a retarding torque.

GIUSEPPE MASSIMO PESTARINI.